US008524785B2

(12) United States Patent
Dewis et al.

(10) Patent No.: US 8,524,785 B2
(45) Date of Patent: Sep. 3, 2013

(54) METHODS FOR USING REBAUDIOSIDE C AS A FLAVOR ENHANCER

(75) Inventors: Mark L. Dewis, Matawan, NJ (US); Kenneth J. Kraut, Union Beach, NJ (US); Debra Merritt, Hopewell, NJ (US); Raymond F. Salemme, Yardley, PA (US)

(73) Assignee: International Flavors and Fragrances Inc., New York, NY (US)

( * ) Notice: Subject to any disclaimer, the term of this patent is extended or adjusted under 35 U.S.C. 154(b) by 0 days.

(21) Appl. No.: 13/332,661

(22) Filed: Dec. 21, 2011

(65) Prior Publication Data

US 2012/0157553 A1    Jun. 21, 2012

Related U.S. Application Data

(63) Continuation-in-part of application No. PCT/US2010/049763, filed on Sep. 22, 2010, which is a continuation-in-part of application No. PCT/US2010/047207, filed on Aug. 31, 2010.

(60) Provisional application No. 61/296,860, filed on Jan. 20, 2010, provisional application No. 61/240,154, filed on Sep. 4, 2009, provisional application No. 61/244,803, filed on Sep. 22, 2009.

(51) Int. Cl.
*A61K 47/36* (2006.01)
*A23L 1/226* (2006.01)

(52) U.S. Cl.
USPC .......................................................... 514/777

(58) Field of Classification Search
USPC .......................................................... 514/777
See application file for complete search history.

(56) References Cited

U.S. PATENT DOCUMENTS

| | | | | |
|---|---|---|---|---|
| 4,361,697 | A | 11/1982 | Dobberstein et al. | 536/128 |
| 4,612,942 | A | 9/1986 | Dobberstein et al. | 131/276 |
| 2006/0134292 | A1 | 6/2006 | Abelyan et al. | 426/548 |
| 2007/0116830 | A1* | 5/2007 | Prakash et al. | 426/548 |
| 2008/0108710 | A1* | 5/2008 | Prakash et al. | 514/783 |
| 2008/0226796 | A1 | 9/2008 | Lee et al. | 426/590 |
| 2009/0162484 | A1 | 6/2009 | Bell et al. | 426/66 |
| 2009/0162487 | A1 | 6/2009 | Bell et al. | 426/72 |
| 2010/0267847 | A1 | 10/2010 | Yoshinaka et al. | 514/777 |

FOREIGN PATENT DOCUMENTS

| | | |
|---|---|---|
| CA | 2185496 | 3/1998 |
| CN | 101628924 | 1/2010 |
| JP | 59045848 | 3/1984 |
| WO | WO 2008/091547 | 7/2008 |
| WO | WO 2011/028671 | 3/2011 |
| WO | WO 2011/037959 | 3/2011 |

OTHER PUBLICATIONS

Schiffman et al., Investigation of synergism binary mixtures of sweeteners, Brain Research Bulletin, 38(2):105-120, 1995.*
Schiffman et al. "Investigation of Synergism in Binary Mixtures of Sweeteners" Brain Research Bulletin 1995 38(2):105-120.
International Search Report from PCT/US2010/047207, Jan. 25, 2011, PCT.
International Search Report from PCT/US2010/049763, Dec. 14, 2010, PCT.
International Search Report from PCT/US2012/070308, Feb. 26, 2013, PCT.

* cited by examiner

*Primary Examiner* — Jeffrey S. Lundgren
*Assistant Examiner* — Zenab Olabowale
(74) *Attorney, Agent, or Firm* — Licata & Tyrrell, P.C.

(57) ABSTRACT

The present invention is directed to the use of one or more rebaudioside C polymorphs, or stereoisomers thereof, to enhance the sweet taste of a flavoring, such as glucosylated steviol glycoside, rebaudioside A, ammoniated glycyrrhizin, neohespherdin dihydrochalcone or thaumatin.

5 Claims, No Drawings

METHODS FOR USING REBAUDIOSIDE C AS A FLAVOR ENHANCER

INTRODUCTION

This patent application is a continuation-in-part application claiming the benefit of priority from PCT/US2010/047207, filed Aug. 31, 2010, which claims benefit of priority from U.S. 61/296,860 filed Jan. 20, 2010 and U.S. 61/240,154, filed Sep. 4, 2009; and PCT/US2010/049763, filed Sep. 22, 2010, which claims benefit of priority from U.S. 61/244,803, filed Sep. 22, 2009, the content of which is incorporated herein by reference in its entirety.

BACKGROUND OF THE INVENTION

The sweet diterpene glycosides of *Stevia* have been characterized, and eight sweet glycosides of steviol have been identified. These glycosides accumulate in *Stevia* leaves where they may attain from 10 to 20% of the leaf weight. On a dry weight basis, a typical profile for the four major glycosides found in the leaves of *Stevia* includes 0.3% dulcoside, 0.6% rebaudioside C, 3.8% rebaudioside A and 9.1% stevioside. Other glycosides identified within *Stevia* include rebaudiosides B, D, and E, and dulcosides A and B. Out of the four major diterpene glycoside flavorings present in *Stevia* leaves only two (stevioside and rebaudioside A) have physical and sensory properties that are well characterized. Stevioside is known to be 110 to 270 times sweeter than sucrose, rebaudioside A 150 to 320 times sweeter than sucrose, rebaudioside D 200 to 250 times sweeter than sucrose, rebaudioside C 40 to 60 times sweeter than sucrose, and dulcoside A 30 times sweeter than sucrose.

Of the diterpene glycosides found in *Stevia* extracts, rebaudioside A is known to have the least aftertaste. This aftertaste is described by many as bitter and licorice-like, and is present in all current *Stevia* extracts.

Rebaudioside A has been tested in mixtures with other flavorings, such as fructose, glucose and sucrose, at sweetness intensities equivalent to 3% (w/v-%), 5% (w/v-%) and 7% (w/v-%) sucrose to determine the presence and degree of synergism in these mixtures (Schiffmann et al., *Brain Research Bulletin* 38:105-120 (1995)). According to the results, rebaudioside A appears to have an additive effect in mixtures with fructose and glucose, but a synergistic effect in binary mixtures with sucrose at sweetness intensities equivalent to 3% (w/v-%) sucrose. At sweetness intensities equivalent to 5% (w/v-%) sucrose, rebaudioside A had an additive effect in mixtures with fructose, glucose and sucrose. At sweetness intensities equivalent to 7% (w/v-%) sucrose, rebaudioside A had an additive effect with a mixture with sucrose, but a suppressive effect with mixtures with glucose and fructose. In fact, no flavoring combinations were synergistic at sweetness intensities equivalent to the 7% (w/v-%) sucrose level.

Rebaudioside A has also been tested in ternary mixtures with other flavorings, such as sucrose, and artificial sweeteners, such as alitame, neohesperidin dihydrochalcone, aspartame, and Na-cyclamate (Schiffmann et al., *Chem. Senses* 25:131-140 (2000)).

U.S. Pat. No. 4,612,942 mentions that diterpene glycosides can modify or enhance flavor characteristics, such as sweet, when the amount of diterpene glycoside added is less than the sweetness threshold level of the diterpene glycoside in the orally consumable composition. However, no consumable composition for enhancing sweet flavor containing rebaudioside A in combination with rebaudioside C and/or dulcoside A, where the amount of rebaudioside A is less than or equal to the amount of each of rebaudioside C or dulcoside A, is described nor how the sweetness intensity of the consumable composition plays a role in the sweetness enhancing effect of a diterpene glycoside. Further, no consumable composition for enhancing sweet flavor containing rebaudioside D in combination with rebaudioside C and/or dulcoside A is described.

U.S. Patent Application Publication No. 2009/0162484 A1 describes beverage products comprising water and a non-sweetening amount of at least one potent natural sweetener. Examples of such potent natural sweeteners are described to be one or more of the steviosides, rebaudiosides and related compounds suitable for sweetening. The publication does not describe any beverage composition according to the present invention.

U.S. Patent Application Publication No. 2009/0162487 A1 describes beverage products comprising a non-sweetening amount of rebaudioside A and a sweetening amount of a sweetener other than rebaudioside A. Examples of flavorings other than rebaudioside A are described to be nutritive natural flavorings, such as sucrose, glucose, or fructose. However, the publication does not describe any beverage composition according to the present invention.

A need exists for more potent sweet taste enhancers that can effectively enhance the sweet taste of a carbohydrate flavoring without exhibiting an off-taste, such as a bitter aftertaste. In particular, a need exists in the art for a method of enhancing the sweetness of consumables that are already very sweet, i.e., that have a sweetness intensity equivalent to from about 5% (w/v-%) to about 12% (w/v-%) sucrose solution.

BRIEF SUMMARY OF THE INVENTION

The present invention is related to the use of at least one rebaudioside C polymorph, or stereoisomer thereof, for enhancing the sweet taste of a flavoring, such as glucosylated steviol glycoside, rebaudioside A, ammoniated glycyrrhizin, neohespherdin dihydrochalcone or thaumatin, without exhibiting an off-taste. A consumable and a method of decreasing the amount of a flavoring in a consumable are also provided. In particular embodiments, the rebaudioside C polymorph is crystalline Form I and the at least one rebaudioside C polymorph, or a stereoisomer thereof, is present at a concentration of from about 100 μM to about 600 μM. In other embodiments, the at least one rebaudioside C polymorph, or a stereoisomer thereof, is administered in a consumable such as a food product, a pharmaceutical composition, a dietary supplement, a nutraceutical, a dental hygienic composition or a cosmetic product.

DETAILED DESCRIPTION OF THE INVENTION

The present invention relates to the use of rebaudioside C for enhancing the sweet taste of flavorings, such as Glucosylated Steviol Glycosides (NSF02), Reb A, ammoniated glycyrrhizin (Magnasweet), Neohespherdin Dihydrochalcone (NHDC) and Thaumatin. C, 13-[(2-O-α-L-rhamnopyranosyl-3-O-β-D-glucopyranosyl-β-D-glucopyranosyl)oxy] kaur-16-en-18-oic acid β-D-glucopyranosyl ester (C.A.S. number 63550-99-2; hereinafter also "Reb C"), is a diterpenoid glycoside. Reb C can be used in a purified or isolated form in the present invention, or as an extract from *Stevia rebaudiana*. Reb C can be prepared by methods known in the art, such as that described in U.S. Pat. No. 4,361,697, incorporated herein by reference in its entirety. In one embodiment, Reb C is extracted from *Stevia rebaudiana*, wherein the extract has less than 10%, preferably less than 5%, and more preferably less than 3% impurities (i.e., compounds other than Reb C) other than water. In another embodiment, one or more polymorphs of Reb C are used. In specific embodiments, Reb C crystalline Form I is used in the methods of this invention. Crystalline Form I is described in PCT/US2010/049763.

Reb C of the present invention may contain one or more asymmetric centers and may thus give rise to enantiomers, diastereomers, and other stereoisomeric forms. The present invention is meant to encompass the uses of all such possible forms, as well as their racemic and resolved forms and mixtures thereof. The individual enantiomers may be separated according to methods known to those of ordinary skill in the art in view of the present disclosure. All tautomers are intended to be encompassed by the present invention as well.

As used herein, the term "stereoisomers" is a general term for all isomers of individual molecules that differ only in the orientation of their atoms in space. It includes enantiomers and isomers of compounds with more than one chiral center that are not mirror images of one another (diastereomers).

The term "chiral center" refers to a carbon atom to which four different groups are attached.

The terms "enantiomer" and "enantiomeric" refer to a molecule that cannot be superimposed on its mirror image and hence is optically active wherein the enantiomer rotates the plane of polarized light in one direction and its mirror image compound rotates the plane of polarized light in the opposite direction.

The term "racemic" refers to a mixture of equal parts of enantiomers and which mixture is optically inactive.

The term "resolution" refers to the separation or concentration or depletion of one of the two enantiomeric forms of a molecule.

As used herein, the term "sweetness intensity" refers to the relative strength of sweet sensation as observed or experienced by an individual, e.g., a human, or a degree or amount of sweetness detected by a taster, for example on the scale from 0 (none) to 8 (very strong) used in sensory evaluations according to the procedure described in *American Society for Testing Materials, Special Technical Publication*-434: "Manual on Sensory Testing Methods," ASTM International, West Conshohocken, Pa. (1996).

As used herein, the phrase "sweet taste enhancing effect" means that the effect of Reb C in combination with a flavoring, is such that the sensory perception of the sweet flavor is potentiated in a more than additive manner, i.e., synergistically. As used herein, the term "sweetness enhancer" is understood to include at least compositions capable of enhancing or intensifying the perception of sweet taste of flavoring compositions or flavored compositions. As used herein, the term "sweetness enhancer" is synonymous with the terms "sweet taste potentiator," "sweetness potentiator," "sweetness amplifier," and "sweetness intensifier." Generally, the sweetness enhancers provided herein may enhance or potentiate the sweet taste of a flavoring without providing any noticeable sweet taste by themselves at acceptable use levels; however, the sweetness enhancers may themselves provide sweet taste at concentrations above a sweetness threshold level. As used herein, the term "sweetness detection threshold level" is understood to include at least the concentration at which the sweetness or off-taste of an entity is perceptible. The sweetness threshold level varies for different entities, and may be varied with respect to the individual, e.g., the human, perceiving the sweetness.

As used herein, the term "off-taste" refers to an amount or degree of taste that is not characteristically or usually found in a consumable. For example, an off-taste is an undesirable taste of a sweetened consumable to the consumers, such as, a bitter taste, a licorice-like taste, a metallic taste, an aversive taste, a nasty taste, an astringent taste, a delayed sweetness onset, and a lingering sweet aftertaste, and the like.

As used herein in connection with a measured quantity, "about" refers to the normal variations in that measured quantity, as expected by the skilled artisan making the measurement and exercising a level of care commensurate with the objective of measurement and the precision of the measuring equipment.

One or more Reb C polymorphs, or stereoisomers thereof, can be used in consumables, e.g., in food products, pharmaceuticals, dietary supplements, nutraceuticals, dental hygienic compositions, or other products as sweetness enhancers, which retain a desired sweetness but contain lower amounts of a flavoring, such as NSF02, Reb A, Magnasweet, NHDC and Thaumatin. In one embodiment, the present invention provides a consumable, comprising an effective amount of a combination of Reb C and a flavoring in a reduced amount in order to achieve the same level of sweetness when the carbohydrate flavoring is used alone in the traditional amount. In one embodiment, the present invention provides a consumable, comprising an effective amount of Reb C and a carbohydrate flavoring in a reduced amount in order to achieve the same level of sweetness when the carbohydrate flavoring is used alone in the traditional amount.

In the present invention, one or more Reb C polymorphs, or stereoisomers thereof, is used in an amount effective to enhance the sweetness of a flavoring without exhibiting an off-taste. In one embodiment, Reb C is present in an amount less than or equal to the flavoring. In another embodiment, the amount of Reb C is greater than or equal to the amount of the flavoring. Any amount of Reb C that provides the desired degree of sweetness enhancement can be used.

In one embodiment of the present invention, a Reb C polymorph or stereoisomer, is used at a concentration of from about 100 μM to about 600 μM. In some embodiments, Reb C is present in the consumable of the present invention at a concentration of from about 100 μM to about 350 μM. In another embodiment, Reb C is present in the consumable of the present invention at a concentration of from about 250 μM to about 350 μM. In one embodiment, Reb C is present in the consumable of the present invention at a concentration of about 250 μM or about 300 μM or more of Reb C. In one embodiment, Reb C is present in the consumable of the present invention at a concentration of about 100 μM, about 150 μM, about 160 μM, about 170 μM, about 180 μM, about 190 μM, about 200 μM, about 210 μM, about 220 μM, about 230 μM, about 240 μM, about 250 μM, about 260 μM, about 270 μM, about 280 μM, about 290 μM, about 300 μM, about 310 μM, about 320 μM, about 330 μM, about 340 μM, or about 350 μM.

In one embodiment, the ratio of one or more Reb C polymorphs, or stereoisomers thereof, to the flavoring is approximately from 1:150 to 1:200 in a solid consumable. In one embodiment, the consumable of the present invention contains about 0.1 to 0.5 g, preferably about 0.3 g, of one or more Reb C polymorphs, or stereoisomers thereof, for every 50 to 100 g of the flavoring. In one embodiment, the consumable of the present invention contains about 0.03 to 0.15 g of one or more Reb C polymorphs, or stereoisomers thereof, for every 50 to 100 g of a flavoring.

According to the present invention, one or more Reb C polymorphs, or stereoisomers thereof, act synergistically with flavorings, such as NSF 02, Reb A, Magnasweet, NHDC and Thaumatin, potentiating sweetness intensity even at high concentrations of the flavoring. In this respect, the amount of flavoring used in a consumable can be reduced. In this respect, the instant method can be performed such that the amount of flavoring required to maintain the desired sweetness of, e.g., a cola beverage is reduced by at least about 10%, 20%, 30%, 40%, 50%, 60%, 70%, 80%, 90%, or 95%, or from about 60% to about 99%, or alternatively from about 20% to about 50%. Thus, in a more specific embodiment, a cola beverage comprising a flavoring, such as NSF 02, Reb A, Magnasweet, NHDC and Thaumatin and one or more Reb C polymorphs, or stereoisomers thereof, contains the Reb C in an amount sufficient to reduce the amount of sugar required to maintain the desired sweetness of the beverage by 10%, 20%, 30%, 40%, 50%, 60%, 70%, 80%, 90%, or 95%, or from about 60% to about 99%, or alternatively from about 30% to about 70%. Of course, in other embodiments, the amount of flavoring required can be decreased to differing extents.

Consumables of the present invention include all food products, dietary supplements, nutraceuticals, pharmaceutical compositions, dental hygienic compositions, and cosmetic products. Also, one or more flavorings other than the flavorings described herein can be present in the consumables of the present invention, for example, high-intensity sweeteners, such as aspartame, acesulfame potassium, sucralose, and saccharin or carbohydrate flavorings such as sucrose, fructose, glucose, high fructose corn syrup, xylose, arabinose, rhamnose, erythritol, xylitol, mannitol, sorbitol, or inositol. The flavoring can be present in the consumable inherently (e.g., in food products containing fruits) or the flavoring is added into the consumable.

The phrase "food product" as used herein includes, but is not limited to, fruits, vegetables, juices, meat products such as ham, bacon and sausage; egg products, fruit concentrates, gelatins and gelatin-like products such as jams, jellies, preserves, and the like; milk products such as ice cream, sour cream, yoghurt, and sherbet; icings, syrups including molasses; corn, wheat, rye, soybean, oat, rice and barley products, cereal products, nut meats and nut products, cakes, cookies, confectionaries such as candies, gums, fruit flavored drops, and chocolates, chewing gum, mints, creams, icing, ice cream, pies and breads, beverages such as coffee, tea, carbonated soft drinks, such as COKE® and PEPSI®, non-carbonated soft drinks, juices and other fruit drinks, sports drinks such as GATORADE®, coffee, teas, iced teas, cola, alcoholic beverages, such as beers, wines and liquors, and KOOL-AID®. Preferably, the food products in which the sweetness of the flavoring is enhanced with one or more polymorphs of Reb C, or a stereoisomer thereof, contains a decreased level of the flavoring. For example, an improved carbonated soft drink can be produced with the same sweetness as the known carbonated soft drink but with a lower sugar content by adding at least one of Reb C polymorph, or a stereoisomer thereof.

Food products also include condiments such as herbs, spices and seasonings, flavor enhancers, such as monosodium glutamate. A food product also includes prepared packaged products, such as dietetic sweeteners, liquid sweeteners, tabletop flavorings, granulated flavor mixes which upon reconstitution with water provide non-carbonated drinks, instant pudding mixes, instant coffee and tea, coffee whiteners, malted milk mixes, pet foods, livestock feed, tobacco, and materials for baking applications, such as powdered baking mixes for the preparation of breads, cookies, cakes, pancakes, donuts and the like. Food products also include diet or low-calorie food and beverages containing little or no sucrose. Especially preferred food products are carbonated beverages containing one or more polymorphs of Reb C, or a stereoisomer thereof. Other examples of food products envisioned in accordance with the present invention are described below and throughout the specification.

In another embodiment, the food product is selected from the group consisting of fruits, vegetables, juices, meat products such as ham, bacon and sausage; egg products, fruit concentrates, gelatins and gelatin-like products such as jams, jellies, preserves, and the like; milk products such as ice cream, sour cream, yoghurt, and sherbet; icings, syrups including molasses; corn, wheat, rye, soybean, oat, rice and barley products, cereal products, nut meats and nut products, cakes, cookies, confectionaries such as candies, gums, fruit flavored drops, and chocolates, creams, icing, ice cream, pies and breads.

In one embodiment, the invention is directed to a method of decreasing the amount of a flavoring in a consumable, such as a food product or a pharmaceutical composition, to exhibit a given level of sweetness, wherein the method comprises reducing the amount of the flavoring and adding at least one of Reb C polymorph, or a stereoisomer thereof, to the consumable in an amount effective to maintain the given level of sweetness.

In one embodiment, the food product is a beverage or a drink comprising a flavoring and one or more Reb C polymporphs, or a stereoisomer thereof. Examples of suitable beverages in which having a sweet taste is desired include, but are not limited to coffee, teas, such as black tea, green tea, fermented tea, semi-fermented tea, carbonated soft drinks, such as COKE® and PEPSI®, non-carbonated soft drinks, lemonade, juices and other fruit drinks, sports drinks, such as GATORADE®, iced teas, cola, alcoholic beverages, such as beers, wines and liquors, and KOOL-AID®. In one embodiment, one or more Reb C polymorphs, or stereoisomers thereof, is present at a concentration about 100 µM to about 600 µM. In one embodiment, the Reb C polymorph or stereoisomer is present in the beverage or drink at a concentration of about 100 µM, about 150 µM, about 160 µM, about 170 µM, about 180 µM, about 190 µM, about 200 µM, about 210 µM, about 220 µM, about 230 µM, about 240 µM, about 250 µM, about 260 µM, about 270 µM, about 280 µM, about 290 µM, about 300 µM, about 310 µM, about 320 µM, about 330 µM, about 340 µM, or about 350 µM. Useful concentrations of Reb C in the beverage or drink of the present invention is about 250 µM or about 300 µM, and specifically 300 µM.

One embodiment of the invention is directed to a method of enhancing the sweet taste of a cola beverage, such as COKE® or PEPSI®, by administering to a subject a cola drink, containing a flavoring and at least one Reb C polymorph, or stereoisomer thereof, wherein the Reb C present in an amount effective to enhance the sweet taste of the flavoring without exhibiting any off-taste. In a preferred embodiment, the cola beverage contains a reduced amount of sugar but maintains substantially the original level of sweet taste. In another embodiment, the Reb C is crystalline Form I.

Cola beverages are prepared by mixing cola concentrate with carbonated water. Typically about 50 mL of cola concentrate is added per 250 mL of carbonated water. Cola concentrate can be prepared by mixing cola flavor, caramel color, and optionally caffeine with water, one or more flavorings, Reb C, and one or more acid components, such as phosphoric acid or citric acid.

A cola flavor refers to either a natural or artificial flavor. Such cola flavors are commercially available. Commercial cola flavors are available, for example, from International Flavor and Fragrances, Dayton, N.J.; Artificial #13573011 and Natural #K3559549. Commercial cola flavors are also available from Tastemaker, Cincinnati, Ohio, and Givaudan Roure, Clifton, N.J.

The acid component refers to an ingredient that contributes sourness to the beverage and is added to balance the flavor profile. Acids include malic acid, citric acid, phosphoric acid or combinations thereof.

For example, the cola concentrate can prepared by mixing phosphoric acid (75% Rhone-Poulenc), citric acid (anhydrous, ADM, Decatur, Ill.), caffeine (Mallinckrodt, Paris, Ky.), caramel Color (DS400, Sethness, Chicago, Ill.), cola Flavor (SN018976, International Flavors and Fragrances, Dayton, N.J.), sucrose, Reb C, and water. The concentrate is blended until all ingredients are dissolved (30-40 minutes) using a magnetic stirring plate. Fifty milliliters of the concentrate are added to 250 mL of carbonated water to complete the preparation of the cola beverage. Fifty milliliters of cola concentrate typically contains from 0.01 to 5 mL of phosphoric acid, preferably about 0.01-1 mL, 0.1 to 100 g of sucrose, preferably about 0.03 g to 0.3 g of Reb C, for every 50 to 100 g of sucrose, about 0.001 g to 0.1 g of citric acid, preferably about 0.005-0.1 g, 0.001 to 1 g of caffeine, preferably about 0.01 to 0.1 g of caffeine, 0.01 to 5 g of caramel flavor, preferably about 0.05 to 1 g, 0.001 to about 10 mL of cola flavor, preferably about 0.01 to about 2 mL.

Food products of the present invention also include animal food products containing a flavoring and at least one Reb C polymorph, or stereoisomer thereof, in an amount sufficient to enhance the sweet taste of the flavoring without exhibiting any off-taste. Animal food products are well known in the art, see, e.g., U.S. Pat. No. 6,403,142, and include dog food, cat food, rabbit food, and the like. The animal food product also include food products useful for feeding livestock, such as cattle, bison, pigs, chicken, and the like. In another embodiment, the animal food product of the present invention is a solid hypoallergenic pet food, comprising a component that contains protein or protein fragments wherein all of said component is partially hydrolyzed and further comprises a Reb C polymorph, or stereoisomers thereof.

In one embodiment, the consumable is a pharmaceutical composition containing a flavoring and a Reb C polymorph, or a stereoisomer thereof. These pharmaceutical compositions may be used to formulate pharmaceutical drugs containing one or more active agents that exert a biological effect other than sweetness enhancement. The pharmaceutical composition preferably further comprises one or more active agents that exert a biological effect. Such active agents include pharmaceutical and biological agents that have an activity other than taste enhancement. Such active agents are well known in the art. See, e.g., The Physician's Desk Reference. Such compositions can be prepared according to procedures known in the art, for example, as described in Remington's Pharmaceutical Sciences, Mack Publishing Co., Easton, Pa., USA. In one embodiment, such an active agent includes bronchodilators, anorexiants, antihistamines, nutritional supplements, laxatives, analgesics, anesthetics, antacids, $H_2$-receptor antagonists, anticholinergics, antidiarrheals, demulcents, antitussives, antinauseants, antimicrobials, antibacterials, antifungals, antivirals, expectorants, anti-inflammatory agents, antipyretics, and mixtures thereof. In one embodiment, the active agent is selected from the group consisting of antipyretics and analgesics, e.g., ibuprofen, acetaminophen, or aspirin; laxatives, e.g., phenolphthalein dioctyl sodium sulfosuccinate; appetite depressants, e.g., amphetamines, phenylpropanolamine, phenylpropanolamine hydrochloride, or caffeine; antacidics, e.g., calcium carbonate; antiasthmatics, e.g., theophylline; antidiuretics, e.g., diphenoxylate hydrochloride; agents active against flatulence, e.g., simethecon; migraine agents, e.g., ergotaminetartrate; psychopharmacological agents, e.g., haloperidol; spasmolytics or sedatives, e.g., phenobarbitol; antihyperkinetics, e.g., methyldopa or methylphenidate; tranquilizers, e.g., benzodiazepines, hydroxinmeprobramates or phenothiazines; antihistaminics, e.g., astemizol, chloropheniramine maleate, pyridamine maleate, doxlamine succinate, bromopheniramine maleate, phenyltoloxamine citrate, chlorocyclizine hydrochloride, pheniramine maleate, and phenindamine tartrate; decongestants, e.g., phenylpropanolamine hydrochloride, phenylephrine hydrochloride, pseudoephedrine hydrochloride, pseudoephedrine sulfate, phenylpropanolamine bitartrate, and ephedrine; beta-receptor blockers, e.g., propanolol; agents for alcohol withdrawal, e.g., disulfiram; antitussives, e.g., benzocaine, dextromethorphan, dextromethorphan hydrobromide, noscapine, carbetapentane citrate, and chlophedianol hydrochloride; fluorine supplements, e.g., sodium fluoride; local antibiotics, e.g., tetracycline or cleocine; corticosteroid supplements, e.g., prednisone or prednisolone; agents against goiter formation, e.g., colchicine or allopurinol; antiepileptics, e.g., phenytoine sodium; agents against dehydration, e.g., electrolyte supplements; antiseptics, e.g., cetylpyridinium chloride; NSAIDs, e.g., acetaminophen, ibuprofen, naproxen, or salts thereof; gastrointestinal active agents, e.g., loperamide and famotidine; various alkaloids, e.g., codeine phosphate, codeine sulfate, or morphine; supplements for trace elements, e.g., sodium chloride, zinc chloride, calcium carbonate, magnesium oxide, and other alkali metal salts and alkali earth metal salts; vitamins; ion-exchange resins, e.g., cholestyramine; cholesterol-depressant and lipid-lowering substances; antiarrhythmics, e.g., N-acetylprocainamide; and expectorants, e.g., guaifenesin.

Active substances which have a particularly unpleasant taste include antibacterial agents such as ciprofloxacin, ofloxacin, and pefloxacin; antiepileptics such as zonisamide; macrolide antibiotics such as erythromycin; beta-lactam antibiotics such as penicillins and cephalosporins; psychotropic active substances such as chlorpromazine; active substances such as sulpyrine; and agents active against ulcers, such as cimetidine. In another embodiment, the pharmaceutical composition of the present invention comprises at least one amino acid selected from the group consisting of glycine, L-alanine, L-arginine, L-aspartic acid, L-cystine, L-glutamic acid, L-glutamine, L-histidine, L-isoleucine, L-leucine, L-lysine, L-methionine, L-ornithine, L-phenylalanine, L-proline, L-serine, L-threonine, L-tryptophan, L-tyrosine, L-valine, creatine, and mixtures thereof.

The pharmaceutical compositions of the present invention are administered to a subject in any form suitable to achieve their intended purpose. Preferably, however, the composition is one which can be administered buccally or orally. Alternatively, the pharmaceutical composition may be an oral or nasal spray. The subject is any animal, such as a human, although the invention is not intended to be so limited. Other suitable animals include canines, felines, dogs, cats, livestock, horses, cattle, sheep, and the like. A veterinary composition, as used herein, refers to a pharmaceutical composition that suitable for non-human animals. Such veterinary compositions are known in the art.

In another embodiment, the pharmaceutical composition is a liquid dosage form for oral administration, including pharmaceutically acceptable emulsions, solutions, suspensions, syrups, and elixirs. In addition to the active compounds, the liquid dosage forms may contain inert diluents commonly used in the art such as, for example, water or other solvents, solubilizing agents and emulsifiers such as ethyl alcohol, isopropyl alcohol, ethyl carbonate, ethyl acetate, benzyl alcohol, benzyl benzoate, propylene glycol, 1,3-butylene glycol, dimethyl formamide, oils (in particular, cottonseed, groundnut, corn, germ, olive, castor, and sesame oils), glycerol, tetrahydrofurfuryl alcohol, polyethylene glycols and fatty acid esters of sorbitan, and mixtures thereof. Suspensions, in addition to the active compounds, may contain suspending agents as, for example, ethoxylated isostearyl alcohols, polyoxyethylene sorbitol and sorbitan esters, microcrystalline cellulose, aluminum metahydroxide, bentonite, agar-agar, and tragacanth, and mixtures thereof.

The pharmaceutical composition of the present invention can be in the form of a chewable tablet. Chewable tablets are known in the art. See, e.g., U.S. Pat. Nos. 4,684,534 and 6,060,078, each of which is incorporated by reference in its entirety. Any kind of medicament may be contained in the chewable tablet, preferably a medicament of bitter taste, natural plant extracts or other organic compounds. More preferably, vitamins such as vitamin A, vitamin B, vitamin $B_1$, vitamin $B_2$, vitamin $B_6$, vitamin C, vitamin E and vitamin K; natural plant extracts such as Sohgunjung-tang extracts, Sipchundaebo-tang extracts and Eleutherococcus senticosus extracts; organic compounds such as dimenhydrinate, meclazine, acetaminophen, aspirin, phenylpropanolamine, and cetylpyridinium chloride; or gastrointestinal agents such as dried aluminum hydroxide gel, domperidone, soluble azulene, L-glutamine and hydrotalcite may be contained in the core.

The pharmaceutical composition of the present invention can be an orally disintegrating composition. Orally disintegrating tablets are known in the art. See, e.g., U.S. Pat. Nos. 6,368,625 and 6,316,029, each of which is hereby incorporated by reference in its entirety.

The pharmaceutical composition of the present invention can be a nasal composition, comprising a flavoring, a Reb C polymorph, or stereoisomers thereof. Nasal sprays are known in the art. See, e.g., U.S. Pat. No. 6,187,332. Addition of Reb C to a nasal spray can reduce the experience of an unpleasant taste associated with the composition of the nasal spray.

The pharmaceutical composition of the present invention can be a solid dosage form, comprising a flavoring and a Reb C polymorph, or stereoisomers thereof, and a water and/or saliva activated effervescent granule, such as one having a controllable rate of effervescence. The effervescent composition may further comprise a pharmaceutically active compound. Effervescent pharmaceutical compositions are known in the art. See, e.g., U.S. Pat. No. 6,649,186, which is incorporated by reference in its entirety. The effervescent composition can be used in pharmaceutical, veterinary, horticultural, household, food, culinary, pesticidal, agricultural, cosmetic, herbicidal, industrial, cleansing, confectionery and flavoring applications. Formulations incorporating the effervescent composition comprising a Reb C polymorph, or stereoisomers thereof, can further include one or more additional adjuvants and/or active ingredients which can be chosen from those known in the art, including flavors, diluents, colors, binders, filler, surfactant, disintegrant, stabilizer, compaction vehicles, and non-effervescent disintegrants.

The pharmaceutical composition can be a film-shaped or wafer-shaped pharmaceutical composition. Such a film-shaped or wafer-shaped pharmaceutical composition can be configured, for example, as quickly disintegrating administration forms, e.g., administration forms disintegrating within a period of 1 second up to 3 minutes, or as slowly disintegrating administration forms, e.g., administration forms disintegrating within a period of 3 to 15 minutes. The indicated disintegration times can be set to the above-mentioned ranges by using, for example, matrix-forming polymers which have different disintegrating, or solubility, characteristics. Thus, by mixing the corresponding polymer components, the disintegration time can be adjusted. In addition, disintegrants are known which "draw" water into the matrix and cause the matrix to burst open from within. As a consequence, certain embodiments of the invention include such disintegrants for the purpose of adjusting the disintegration time.

Suitable are polymers for use in the film-shaped or wafer-shaped pharmaceutical composition include cellulose derivatives, polyvinyl alcohol (e.g. MOWIOL™), polyacrylates, polyvinyl pyrrolidone, cellulose ethers, such as ethyl cellulose, as well as polyvinyl alcohol, polyurethane, polymethacrylates, polymethyl methacrylates and derivatives and copolymerisates of the aforementioned polymers.

In certain embodiments, the total thickness of the film-shaped or wafer-shaped pharmaceutical composition according to the invention is preferably 5 μm up to 10 mm, preferably 30 μm to 2 mm, and with particular preference 0.1 mm to 1 mm. The pharmaceutical preparations may be round, oval, elliptic, triangular, quadrangular or polygonal shape, but they may also have any rounded shape.

In one embodiment, the pharmaceutical composition can be a gum base formulation comprising a medicament or agent, a flavoring and a Reb C polymorph, or stereoisomer thereof, in a coating that surrounds the gum base formulation. Preferably, the coating comprises at least 50% by weight of the entire product. As the center is chewed, the medicament or agent is released into the saliva. For example, U.S. Pat. No. 6,773,716, which is incorporated herein by reference in its entirety, discloses a suitable medicament or agent contained in a coating that surrounds a gum base formulation. It has been found that with respect to certain medicaments or agents that may have an astringent or bitter taste that by adding a sweet taste enhancing agent to the formulation, that a much more palatable formulation, including the medicament, can be provided. In this regard, even though the medicament in, for example, its powder form may be bitter or have an offensive taste, the matrix used as the coating of the present invention, including the enhancing agent, will afford a product having acceptable medicinal properties.

The pharmaceutical composition of the present invention can be in the form of an aerosol. The aerosol composition may further comprise pharmaceutically active agent. Aerosol compositions are known in the art. See, e.g., U.S. Pat. No. 5,011,678, which is hereby incorporated by reference in its entirety. As a nonlimiting example, an aerosol composition according to the present invention may comprise a medically effective amount of a pharmaceutically active substance, one or more flavorings, a Reb C polymorph, or stereoisomer thereof, and a biocompatible propellant, such as a (hydro/fluoro)carbon propellant.

In one embodiment of the present invention, the pharmaceutical composition is a nutritional composition. Examples of nutritional compositions having an undesirable taste include, but are not necessarily limited to, enteral nutrition products for treatment of nutritional deficit, trauma, surgery, Crohn's disease, renal disease, hypertension, obesity and the like, to promote athletic performance, muscle enhancement or general well being or inborn errors of metabolism such as phenylketonuria. In particular, such nutritional formulations may contain one or more amino acids which have a bitter or metallic taste or aftertaste. Such amino acids include, but are not limited to, an essential amino acids selected from the group consisting of L isomers of leucine, isoleucine, histidine, lysine, methionine, phenylalanine, threonine, tryptophan, tyrosine, and valine.

In one embodiment, the sweet taste of the pharmaceutical composition or nutritional composition of the present invention is being enhanced by a Reb C polymorph, or stereoisomer thereof, by at least about 10%, 20%, 30%, 40%, 50%, 60%, 70%, 80%, 90%, or 95%, or from about 60% to about 99%, or alternatively from about 20% to about 50%.

In one embodiment, the consumable of the present invention is a dental hygienic composition composed of a flavoring, a Reb C polymorph, or a stereoisomer thereof, in an amount sufficient to enhance the sweet taste of the flavoring without exhibiting any off-taste. Dental hygienic compositions are known in the art and include, but are not necessarily limited to, toothpaste, mouthwash, plaque rinse, dental floss, dental pain relievers (such as ANBESOL™), and the like.

In another embodiment, the consumable of the present invention is a cosmetic product containing a flavoring, a Reb C polymorph, or a stereoisomer thereof. For example, but not by way of limitation, the cosmetic product can be a face cream, lipstick, lip gloss, and the like. Other suitable compositions of the invention include lip balm, such as CHAPSTICK® or BURT'S BEESWAX® Lip Balm, further containing a Reb C polymorph, or a stereoisomer thereof.

The levels of Reb C described herein reflect a creative solution to sweet modulation. As will be appreciated by the skilled artisan, the levels of Reb C and other sweet materials may vary depending on the level of flavoring being reduced as well as the application itself.

In certain embodiments, the preferred levels for Reb C in beverage applications are 100 ppm, with the range for beverage from 100 ppm to 200 ppm and the outer limits ranging from 100 ppm to 250 ppm.

The other embodiments, particular levels for Reb C in yogurt applications are 100 ppm, with the range for the application from 80 ppm to 250 ppm and the outer limits ranging from 80 ppm to 400 ppm.

In still other embodiments, the preferred levels of Reb C in oatmeal applications range from 40 ppm to 400 ppm, 40 ppm to 250 ppm and preferably from 50 ppm to 200 ppm.

The following examples are illustrative, but not limiting, of the compounds, compositions, and methods of the present invention. Suitable modifications and adaptations of the variety of conditions and parameters normally encountered in clinical therapy and which are obvious to those skilled in the art in view of this disclosure are within the spirit and scope of the invention.

EXAMPLE 1

Evaluation of Sweetness Intensity

Products are evaluated using a sequential monadic test protocol. Subjects are given a sip (about 2.2 mL from a ca. 1 oz or ca. 30 mL sample) of a control sample into the mouth. The sip is swallowed, the subject waits for about 15 to 25 seconds, a second sip of the control is taken and swallowed, and the taste is perceived. Thereafter, these steps are repeated with an experimental sample, and the sweetness can be compared to the control sample. These steps may, for example, be repeated.

EXAMPLE 2

Reb C in Combination with Other Flavorings in Orange Still Beverage

An orange flavored beverage commercially available from International Flavor and Fragrances was prepared (Table 1). The control sample contained 8 Brix, the measurement of mass ratio of dissolved sugar in a liquid. The sugar used in all experiments was table sugar. In addition, samples containing combinations of rebaudioside C with other known sweet compounds were evaluated.

TABLE 1

| Compound Name | Quantity |
| --- | --- |
| Decanal | 0.5% |
| Sinensal | 0.2% |
| Ethyl Butyrate | 0.05% |
| Orange Oil 1X | 5.0% |
| Ethanol | 94.25% |

The objective was to determine whether the overall Brix of the beverage could be lowered 50% and still maintain the same sweetness and temporal profile of the 8 Brix control. There were ten samples evaluated including; 8 Brix beverage, 4 Brix beverage, four samples of different combinations of sweet compounds and four samples of the RP44 added to the sweet compound combinations. The samples are listed in Table 2.

TABLE 2

| Compound Name | 1 | 2 | 3 | 4 | 5 | 6 | 7 | 8 |
| --- | --- | --- | --- | --- | --- | --- | --- | --- |
| Reb C |  | 150 |  | 150 |  | 150 |  | 150 |
| NSF02 | 400 | 400 | 350 | 350 | 350 | 350 | 350 | 350 |
| Reb A | 20 | 20 |  |  |  |  |  |  |
| Magnasweet |  |  | 200 | 200 |  |  |  |  |
| NHDC 7.5% |  |  |  |  | 100 | 100 |  |  |
| Thaumatin |  |  |  |  |  |  | 10 | 10 |

*Use Level was ppm

The samples were evaluated by a trained technical panel. The group recorded taste comments based on the different combinations of sweet materials with and without the addition of rebaudioside C. The taste comments comparing Test 1 and Test 2 were the following. Test 2 was sweeter and had a more sugary mouthfeel than Test 1. The offnote was less in Test 2 than Test 1 and slightly sweeter. The comments comparing Test 3 and Test 4 were the following. Test 4 was sweet, better mouthfeel, cooling, linger, smoother, creamy, enhanced sweetness and mouthfeel. The comments comparing Test 5 and Test 6 were as follows. Test 6 was sweet, clean, and sweeter than Test 5, enhanced mouthfeel and enhanced overall orange flavor. The comments for Test 7 and Test 8 were as follows. Test 8 has a better mouthfeel, heavy cooked orange, sweet, nice enhancement, sugary mouthfeel, brings the sweetness profile more upfront.

The samples were also rated based on preference for how similar the rebaudioside C samples were to the full sugar control. The ratings scale was 5 points with 1 being the lowest sweetness or least similar in profile and 5 the highest sweetness or most similar in profile. The full sugar was given a rating of 5 and the 50% reduced sugar was given a rating of 2. The tests with the rebaudioside C were given the following ratings; Test 2 was a 4, Test 4 was a 2.5, Test 6 was a 3.5 and Test 8 was a 3.

In conclusion, the samples containing the rebaudioside C had more mouthfeel and more increased sweetness than the samples without the RP44.

EXAMPLE 3

Rebaudioside C in Combination with Other Flavorings in Vanilla Flavored Yogurt

A non-fat commercially available vanilla flavored yogurt was prepared to evaluate flavoring combinations with and without rebaudioside C (Table 3). The objective was to determine which yogurt sample gives the closest sweet intensity and temporal profile of the full sugar control. The control sample contained 8% sugar. The sugar was reduced 40% to 4.8% sugar, and the combinations were added to the base. There were eight combinations evaluated (Table 4).

TABLE 3

| Compound Name | Quantity |
|---|---|
| Vanillin | 0.80% |
| Delta Decalactone | 0.08% |
| Ethyl Acetate | 0.10% |
| Acetyl methyl carbinol | 0.08% |
| Furfural | 0.06% |
| *Vanilla* Extract | 2.00% |
| Ethanol | 90.94% |

TABLE 4

| Compound Name | 1 | 2 | 3 | 4 | 5 | 6 | 7 | 8 |
|---|---|---|---|---|---|---|---|---|
| Reb C | | 100 | | 100 | | 80 | | 100 |
| NSF 02 | 150 | 150 | 200 | 200 | 200 | 200 | 150 | 150 |
| RebA | 15 | 15 | | | | | | |
| Magnasweet | | | 50 | 50 | | | | |
| NHDC 7.5% | | | | | 80 | 80 | | |
| Thaumatin | | | | | | | 5 | 5 |

*Use Level in ppm

The samples were evaluated by a trained technical panel. The panel described the differences between the samples with rebaudioside C to the samples without rebaudioside C. The comments for the test 1 and test 2 were as follows; test 2 had more mouthfeel, sugary profile and enhanced flavor. The comments for test 3 and test 4 were as follows; test 4 exhibited enhanced sweetness, enhanced mouthfeel, covered some off notes, more upfront sweet, sugary mouthfeel, and enhanced flavor. The comments for test 5 and test 6 were as follows; test 6 enhanced mouthfeel, smoother, sweeter profile, more upfront sweet, sugary mouthfeel, clean, closer to the control 8% sugar, and enhanced flavor. The comments for test 7 and test 8 were as follows; test 8 enhanced mouthfeel, enhanced sweetness, enhanced vanillin flavor, and was slightly browner.

In addition, the samples containing the rebaudioside C were rated against the full sugar control. The ratings were based on a 5 point scale; with 5 being the sweetest and closest in profile and 1 being the least sweet and similar in profile. The rating for the full sugar sample was a 5. The other samples rated in the following ascending order. The most similar was test 4 with a rating of 4.5, test 1 with a rating of 4, test 3 with a rating of 3 and test 2 with a rating of 1.

In conclusion, the samples that had the rebaudioside C performed better than the samples without the rebaudioside C in all combinations.

What is claimed is:

1. A method of enhancing a sweet taste of a flavoring, comprising administering to a subject the flavoring and at least one rebaudioside C polymorph, or a stereoisomer thereof, in an amount effective to provide the sweet taste enhancing effect without exhibiting a bitter, metallic, aversive, or astringent taste, wherein the at least one rebaudioside C polymorph comprises crystalline Form I.

2. The method of claim 1, wherein the flavoring is a glucosylated steviol glycoside, rebaudioside A, ammoniated glycyrrhizin, neohespherdin dihydrochalcone or thaumatin.

3. The method of claim 1, wherein the flavoring and at least one rebaudioside C polymorph, or a stereoisomer thereof, is administered in a consumable.

4. The method of claim 3, wherein the consumable is a food product, a pharmaceutical composition, a dietary supplement, a nutraceutical, a dental hygienic composition or a cosmetic product.

5. The method of claim 1, wherein the at least one rebaudioside C polymorph, or a stereoisomer thereof, is present at a concentration of from about 100 μM to about 600 μM.

* * * * *

UNITED STATES PATENT AND TRADEMARK OFFICE
CERTIFICATE OF CORRECTION

PATENT NO. : 8,524,785 B2  
APPLICATION NO. : 13/332661  
DATED : September 3, 2013  
INVENTOR(S) : Mark L. Dewis et al.

Page 1 of 1

It is certified that error appears in the above-identified patent and that said Letters Patent is hereby corrected as shown below:

On the Title Page at (63) line 2,
delete: "which is"
insert: -- and --

Signed and Sealed this
Fifth Day of November, 2013

Teresa Stanek Rea
*Deputy Director of the United States Patent and Trademark Office*